Patented Jan. 19, 1954

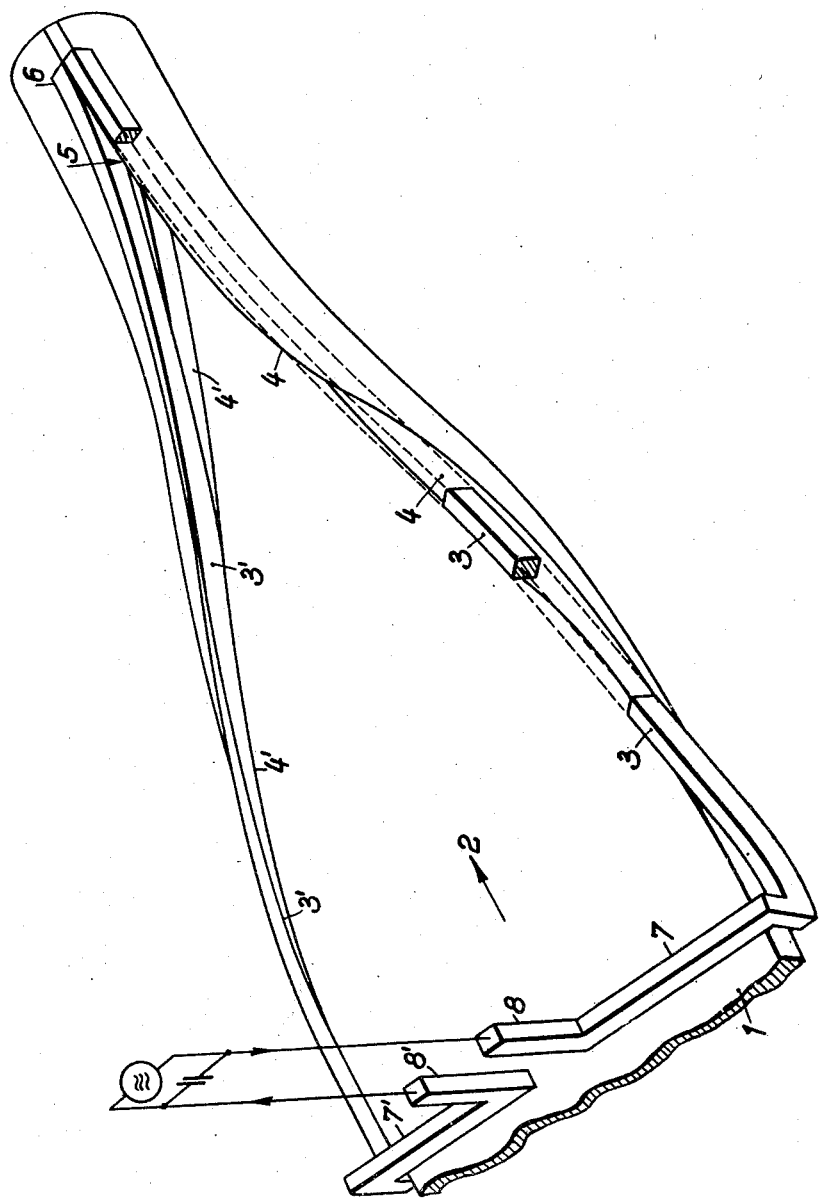

2,666,831

UNITED STATES PATENT OFFICE 2,666,831

METHOD OF PRODUCING TUBES FROM STRIP MATERIAL

Gerhard Seulen and Fritz Alf, Remscheid-Hasten, Germany, assignors to Deutsche Edelstahlwerke Aktiengesellschaft, Krefeld, Germany Application October 5, 1951, Serial No. 249,978

Claims priority, application Germany November 2, 1950

5 Claims. (Cl. 219—6)

The present invention relates to a method of producing tubes from strip material by progressively bending or rolling the strip material into tube form and welding its edges by means of an inductor to form a longitudinal seam.

Hitherto for this purpose inductors have been proposed which surround the part of the strip already bent to form the slit tube and comprise conductor branches which, extending parallel to the edges to be welded, provide a hair-pin like reversal of the path of the current in the vicinity of the welding point.

With the object of achieving more effective welding the invention is characterized by the employment of an inductor, the heat conductor branches of which are arranged in proximity to the edges of the unrolled strip and extend in proximity thereto up to the welding point. The terminal end portions of the heat conductor branches are advantageously located below or above the unrolled strip, e. g., by inturning end portions of the inductor towards the longitudinal centre line of the strip. The inductor follows the changing aspect and course of the edges of the strip, while the latter is rolled to a slit tube form as by pressure rollers in the usual manner and the tube is moved relatively to the inductor in the direction of its longitudinal axis.

One embodiment of the invention is shown diagrammatically in perspective in the drawing.

While the strip 1 is being moved in the direction of the arrow 2, it is bent by rollers (not shown) to form a slit tube whose edges are then welded by induction heating to form its longitudinal seam.

The inductor is so constructed that its conductor branches 3 and 3' extend in proximity to the edges 4 and 4' of the strip in such manner that they follow the changing aspect and course of the edges of the strip. The branches 3 and 3' may extend alongside or in the vicinity of the edges 4 and 4' and it is advantageous in certain cases, over the length of the heat conductor branches for them to change from one such position to the other.

Arranged in the vicinity of the welding point 5 is the region 6 where the path of the current makes a hair-pin like bend, the region 6 being advantageously arranged somewhat on the far side of the welding point proper. This arrangement assists welding and improves the weld.

In the drawing, the hair-pin like bend 6 in the path of the current is made close behind the welding point 5 and during the travel of the strip, the weld is cooled comparatively rapidly since the heat flows away towards the sides of the tube.

In order to reduce the cooling rate of the weld, the aforesaid hair-pin like bend 6 can also be set further behind the welding point, the conductor branches of the inductor being led parallel close to the welding seam from the welding point up to the return point of the aforesaid hair-pin like bend. In this case there is a lesser temperature slope giving rise to an after glow effect of the weld.

In order to obtain a slightly decreasing temperature characteristic inside the welding seam during the travel of the tube, the magnetic coupling distance i. e., the distance between the conductor and the work can be gradually increased from the welding point, where the heat conductor branches are disposed close above the tube, in the direction of travel of the tube, by progressively increasing the spacing between the tube and inductor branches disposed above the same. However, the spacing of the aforesaid branches at the aforesaid hair-pin like bend from the tube should not exceed 5 to 7 mm. as the maximum coupling width.

The length of the local parts of the conductor branches from the weld point to the hair-pin like bend which parts serve for the finishing treatment is adjusted according to the tube dimensions (diameter, wall thickness) to the material and above all to the speed of travel. A desired temperature characteristic can be obtained by varying the coupling factor.

The conductor branches extending in proximity to the edges of the strip as these are turned into seaming relationship produce a preheating of these edges over an appreciable distance, so that welding may be affected with more certainty and efficiency at high speed. In the illustrated example end portions 7, 7' of the inductor are inturned in the vicinity of the still unrolled strip.

The coupling distance and the cross-section of the inturned ends 7, 7' may be different from the coupling distance and cross-section of the conductor branches 3 and 3' respectively. In particular the conductor cross-section can be increased and the coupling distance in this region can be increased. Moreover, the conductor sections 3, 3' or 6 can be provided with magnet yokes, while these can be wholly or partially omitted in the inturned end portions 7, 7'.

The heating of the strip substantially throughout its cross-section by the inturned end portions 7, 7' to comparatively low temperatures is of advantage to the rolling-in process.

In the example selected, the inturned end portions 7, 7' which may also carry two lead connections such as terminals 8, 8', which may be offset, are led inwards above the strip 1. In many cases, however, it is advantageous to lead the inturned end portions 7, 7' inwards under the strip. The lead connections may be located in the region of the still unrolled strip, as shown in the drawing, or elsewhere along the branches of the inductor.

What we claim is:

1. The method of producing a tube from strip material by progressively shaping the strip material to tube form and welding its edges to form a longitudinal seam by means of an inductor having heat conductor branches which extend from the edges of the unrolled strip to the welding position in proximity to and substantially following the changing aspect and course of the said edges.

2. The method according to claim 1 in which end portions of the inductor are inturned towards the centre of the unrolled portion of the strip.

3. The method of producing a tube from strip material by progressively shaping the strip material to tube form and welding its edges to form a longitudinal seam by means of an inductor the heat conductor branches of which extend from the edges of the unrolled strip to the welding position and thence parallel to the welded seam.

4. The method according to claim 3, in which a falling temperature characteristic in the welded seam is produced by arranging that the spacing of the inductor branches from the tube increases from the welding point in the direction towards the region of the branches where the path of the current makes a hair-pin like bend to decrease the magnetic coupling factor of that part of the inductor.

5. An inductor for heating the edges of skelp for the production of a tube therefrom, said inductor having heat conducting branches converging to a junction and being shaped substantially to follow the edges of the skelp between the skelp in the flat and its edges brought opposite one another in the tube.

GERHARD SEULEN.
FRITZ ALF.

References Cited in the file of this patent

UNITED STATES PATENTS

| Number | Name | Date |
|---|---|---|
| 2,528,758 | King | Nov. 7, 1950 |
| 2,575,381 | Colby | Nov. 20, 1951 |
| 2,582,955 | Body | Jan. 22, 1952 |
| 2,582,963 | Cachat | Jan. 22, 1952 |